US011678334B2

(12) United States Patent
Vaidya et al.

(10) Patent No.: US 11,678,334 B2
(45) Date of Patent: Jun. 13, 2023

(54) ENHANCEMENT OF CONFIGURED GRANT COMMUNICATIONS IN A WIRELESS NETWORK

(71) Applicant: Charter Communications Operating, LLC, St. Louis, MO (US)

(72) Inventors: Maulik V. Vaidya, Palmdale, CA (US); Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 418 days.

(21) Appl. No.: 16/543,877

(22) Filed: Aug. 19, 2019

(65) Prior Publication Data

US 2020/0314887 A1    Oct. 1, 2020

Related U.S. Application Data

(60) Provisional application No. 62/826,906, filed on Mar. 29, 2019.

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04W 72/0446* (2013.01); *H04W 72/21* (2023.01)

(58) Field of Classification Search
CPC ... H04L 1/1812; H04L 1/1822; H04L 1/1896; H04W 72/0446; H04W 72/1284;
(Continued)

(56) References Cited

U.S. PATENT DOCUMENTS 10,701,677 B2 * 6/2020 Park .................. H04L 1/1671
2016/0183241 A1 * 6/2016 Lee .................. H04W 56/0015
455/425

(Continued)

OTHER PUBLICATIONS

"5G; NR; Physical layer procedures for control (3GPP TS 38.213 version 15.3.0 Release 15)" ETSI TS 138 213 V15.3.0 (Oct. 2018), Ref. No. RTS/TSGR/0138213vf30, Published Oct. 2018, pp. 0-101. (Year: 2018).*

(Continued)

*Primary Examiner* — Thomas R Cairns
(74) *Attorney, Agent, or Firm* — Armis IP Law, LLC

(57) ABSTRACT

According to one configuration, a system includes user equipment in communication with a wireless base station. The user equipment receives resource allocation information facilitating communication of wireless communications in a network environment. The user equipment is operable to: produce a first configured grant communication to include: i) first information specifying attributes (such as a first selected identifier value) of the first configured grant communication, and ii) second information specifying attributes (such as a second selected identifier value) of a second (buffered) configured grant communication to be communicated from the user equipment to the wireless base station after communication of the first configured grant communication to the wireless base station. The user equipment communicates the first configured grant communication to the wireless base station and then follows up with communication of the second configured grant communication to the wireless base station.

40 Claims, 10 Drawing Sheets

(51) Int. Cl.
*H04W 72/0446* (2023.01)
*H04W 72/21* (2023.01)

(58) Field of Classification Search
CPC ..... H04W 72/14; H04W 72/21; H04W 72/23;
H04W 72/231; H04W 72/232
See application file for complete search history.

(56) References Cited

U.S. PATENT DOCUMENTS

| | | | |
|---|---|---|---|
| 2017/0013499 A1* | 1/2017 | Chen | H04W 72/048 |
| 2017/0332392 A1* | 11/2017 | Miao | H04W 72/12 |
| 2018/0160423 A1* | 6/2018 | Yan | H04W 72/1284 |
| 2019/0150196 A1* | 5/2019 | Koorapaty | H04L 1/1812 |
| | | | 370/329 |
| 2019/0349954 A1* | 11/2019 | Quan | H04W 72/1268 |
| 2020/0100273 A1* | 3/2020 | Gao | H04W 72/1284 |
| 2020/0260486 A1* | 8/2020 | Zhou | H04W 72/042 |
| 2020/0281012 A1* | 9/2020 | Behravan | H04W 72/1284 |
| 2020/0288344 A1* | 9/2020 | Zhang | H04W 4/40 |

OTHER PUBLICATIONS

Pritikin, M. et al. "Bootstrapping Remote Secure Key Infrastructure (BRSKI) draft-ietf-anima-bootstrapping-keyinfra-19" published Mar. 7, 2019, pp. 1-101. (Year: 2019).*
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, pub. Dec. 2018, pp. 1-363 (Year: 2018).*

* cited by examiner

ENHANCEMENT OF CONFIGURED GRANT COMMUNICATIONS IN A WIRELESS NETWORK

RELATED APPLICATIONS

This application is related to and claims the benefit of earlier filed U.S. Provisional Patent Application Ser. No. 62/826,906 entitled "ENHANCEMENT OF CONFIGURED GRANT COMMUNICATIONS IN A WIRELESS NETWORK," filed on Mar. 29, 2019, the entire teachings of which are incorporated herein by this reference.

BACKGROUND

Conventional wireless networks support dynamic assignment of uplink transmission grants and associated HARQ (Hybrid Automatic Repeat Request) identifiers by a wireless base station to different user equipment (UE). The dynamic grants enable the user equipment to communicate data on a respective uplink to a wireless base station based on a HARQ identifier value temporarily assigned for use by the user equipment.

In addition to dynamic grants, conventional wireless networks support so-called configured grant communications in which respective user equipment selects a HARQ identifier value out of a pool of HARQ identifier values associated with uplink communications on pre-defined time-frequency resources from the user equipment to a wireless base station.

One purpose of configured grants is to provide more efficient use of shared wireless resources. For example, according to conventional techniques, a base station allocates the pool of HARQ identifier values for use by the multiple communication devices to randomly select a HARQ identifier value and communicate a respective data payload (based on the selected HARQ identifier value) in an uplink to a wireless base station. By allocating the HARQ identifier values for use by the mobile communication devices to support the configured grants, the wireless base station eliminates packet transmission delay that would otherwise occur if the user equipment (communication devices) had to always communicate with the wireless base station for assignment of a HARQ identifier value to transmit a respective data payload. In other words, to communicate a newly available data payload, the mobile communication device need only select an available HARQ identifier value from the pool and communicate the data payload when an appropriate wireless bandwidth is available.

BRIEF DESCRIPTION OF EMBODIMENTS

There are deficiencies associated with conventional techniques of implementing configured grant communications in a wireless network environment. For example, conventional configured grant communications are prone to collisions (e.g., multiple devices select and attempt to use the same HARQ identifier value) because it is not known which of the HARQ identifier values will be chosen by the user equipment to support a respective uplink communication until after the communication is sent. In the event of such a collision (such as when the wireless base station and user equipment both select the same HARQ identifier value), and the user equipment receives notification from the wireless base station that it is to use the same HARQ identifier value in a dynamic uplink grant for a subsequent communication, the user equipment (UE) must drop its corresponding configured grant (CG) payload and re-encode the payload as dictated by the superseding dynamic uplink grant, which results in an increase in UE processing, possible delay of communications, and complexity.

Embodiments herein provide improved use of allocated resources to support wireless communications.

More specifically, one embodiment herein includes user equipment in a wireless network environment. The user equipment produces a first configured grant communication to include: i) first bit information specifying attributes of a first data payload in the first configured grant communication, and ii) second bit information specifying attributes of a second data payload to be communicated in a second configured grant communication from the user equipment to a wireless base station. The user equipment communicates the first configured grant communication to the wireless base station such as during a first channel occupancy time (timeslot, timeframe, etc.). The user equipment communicates the second configured grant communication to the wireless base station in a second channel occupancy time (timeslot) to the wireless base station. The second timeslot is delayed (spaced apart) with respect to the first timeslot.

In accordance with further embodiments, the attributes as specified by the second bit information in the first configured grant communication indicates planned usage of a wireless link over which the second configured grant communication is to be transmitted from the user equipment to the wireless base station. Accordingly, via the second bit information, the wireless base station is informed as to planned usage of the wireless link by the user equipment to communicate the second configured grant communication.

Additionally, or alternatively, note that the second bit information can be configured to include time domain information specifying a degree (such as amount of time, timeslots, number of communications, size of data payload, etc.) to which the user equipment plans to subsequently use the wireless link to convey the second configured grant communication to the wireless base station.

In accordance with further embodiments, the second bit information can be configured to include frequency domain information specifying a degree to which the user equipment plans to use available channel bandwidth to convey the second configured grant communication to the wireless base station. In other words, via the second bit information, the user equipment can be configured to specify an amount of buffered data to be transmitted over a wireless communication link to the wireless base station.

In yet further embodiments, the second bit information indicates communication transmission parameter settings associated with communicating the second configured grant communication to the wireless base station.

In still further embodiments, the user equipment receives configuration information (such as resource allocation information) from the wireless base station; the configuration information includes multiple (process) identifier values selectable by the user equipment to generate configured grant communications. In such an instance, the first bit information includes a first identifier value and a second identifier value, each of which is selected from the multiple identifier values as specified by the configuration information. Assume that the user equipment selects the first identifier value to indicate attributes of the first data payload and includes the first identifier value in the first configured grant communication. Further, assume that the user equipment selects the second identifier value to indicate attributes of the second data payload and includes the second identifier value in the first configured grant communication. Communication of the second identifier value in a supplemental data field of the first configured grant communication notifies the wireless base station that the user equipment plans to use the second identifier value to communicate the second configured grant communication at a later time in a different time window.

In yet further embodiments, the wireless base station is operable to support configured grants and dynamic grants in an unlicensed radio band over which the user equipment communicates the first configured grant communication, second configured grant communication, etc., in an uplink direction to the wireless base station.

Further embodiments herein include user equipment operable to: select multiple identifier values; assign each of the multiple identifier values to a respective configured grant communication of multiple configured grant communications to be communicated to a wireless base station; and communicate identities of the selected multiple identifier values in a communication from user equipment selecting the multiple identifier values to the wireless base station. As previously discussed, the communication notifies the wireless base station that the user equipment reserves use of the selected identifier values to communicate configured grant communications at a later time.

In one embodiment, the communication including identities of the selected identifier values is a first configured grant communication communicated from the user equipment to the wireless base station. In yet further embodiments, the first configured grant communication includes a first data payload generated by the user equipment; the first configured grant communication is assigned a first identifier value of the multiple identifier values. The second configured grant communication is assigned a second identifier value. The user equipment communicates the second configured grant communication to the wireless base station. The second configured grant communication includes the second identifier value and a second data payload generated by the user equipment. The first configured grant communication and the second configured grant communication are transmitted during separate channel occupancy times (different timeslots).

In yet further embodiments, the multiple identifier values are HARQ (Hybrid Automatic Repeat Request) identifier values corresponding to PUSCH (Physical Uplink Shared Channel) transmissions in subsequent slots.

In still further embodiments, the multiple identifier values are supplemental data for selective inclusion in configured grant Uplink Control Information (UCI) of a first uplink configured grant communication.

Thus, in one embodiment, it is proposed to solve the problem of allowing a gNB (wireless base station) to perform more informed decisions on picking a HARQ-ID value which will is likely to avoid collisions as follows:

i) it is assumed that NR-CG-UCI will have the same format as LTE AUL-UCI w/updated (e.g. 4-bit HARQ process number to be changed to 5-bit: because NR supports 32 HARQ-IDs in UL and 32 in DL) and new information.

ii) it is proposed to add one or more new data fields in NR-CG-UCI (uplink control information of a configured grant communication) to indicate which HARQ-IDs the UE has already allocated for UL (uplink) data that's in its buffer but that will not be transmitted in the current TXOP (transmit opportunity or current timeslot) such as due to Maximum channel occupancy time limits.

iii) The gNB (wireless base station) takes this information into account to: a) allocate HARQ-IDs for subsequent Scheduled UL data for that UE. And/or; b) re-assign HARQ-IDs indicated in NR-AUL-UCI, which are presently intended to be used for AUL/CG transmissions to force Scheduled UL transmission (knowing that it may not fit in that UE's future TXOP). In one embodiment, the HARQ process number (identifier value or tag) is a 4-bit value (or other suitable value) indicating which of the 16 UL HARQ-IDs is being acknowledged in a respective transmission by the user equipment.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: produce a first configured grant communication to include: i) first information specifying attributes of a first data payload in the first configured grant communication, and ii) second information specifying attributes of a second data payload to be communicated in a second configured grant communication from the user equipment to a wireless base station; and communicate the first configured grant communication to the wireless base station.

Another embodiment herein includes a computer readable storage medium and/or system having instructions stored thereon. The instructions, when executed by the computer processor hardware, cause the computer processor hardware (such as one or more co-located or disparately located processor devices or hardware) to: select multiple identifier values; assign each of the multiple identifier values to a respective configured grant communication of the multiple configured grant communications to be communicated to a wireless base station; and communicate identities of the multiple identifier values in a communication from user equipment selecting the multiple identifier values to the wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
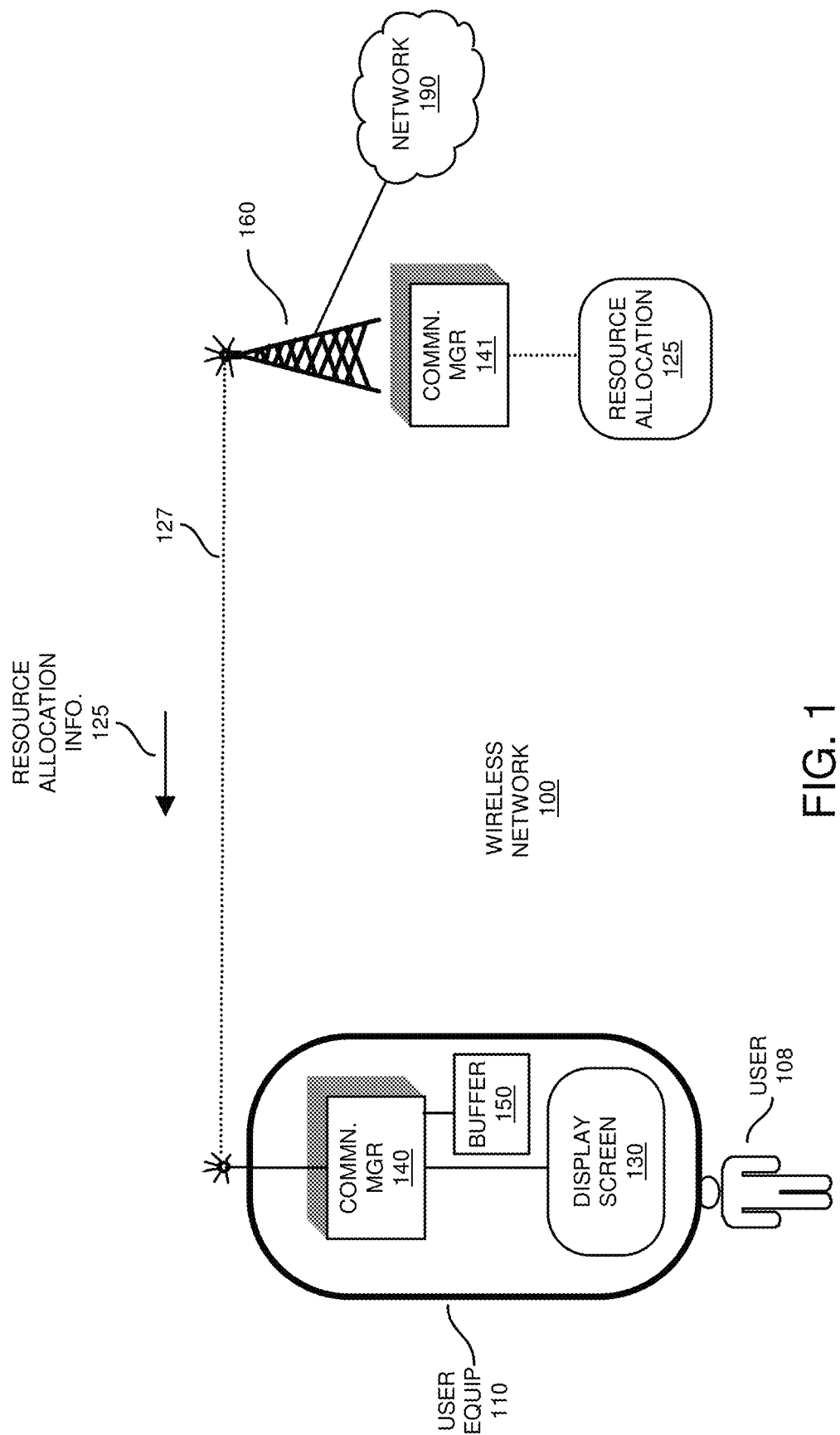
FIG. 1 is an example diagram illustrating allocation of resources in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A system includes user equipment in communication with a wireless base station. The user equipment receives allocated resources associated with wireless communications such as identities of multiple selectable identifier values associated with configured grant communication. The user equipment is operable to: produce a first configured grant communication to include: i) first information specifying attributes (such as a first selected identifier value) of the first configured grant communication, and ii) second information specifying attributes (such as a second selected identifier value) of a second (buffered) configured grant communication to be communicated from the user equipment to the wireless base station after communication of the first configured grant communication to the wireless base station. The user equipment communicates the first configured grant communication to the wireless base station and then follows up with communication of the second configured grant communication to the wireless base station.

Now, with reference to the drawings, FIG. 1 is an example diagram illustrating a wireless network environment including user equipment and a wireless base station according to embodiments herein.

As shown, wireless network environment 100 includes user equipment 110 operated by user 108 and wireless base station 160. User equipment 110 includes communication manager 140, supporting communications with the wireless base station 160. Wireless base station includes communication manager 141 supporting communications with one or more mobile communication devices (different instances of user equipment) in the network environment 100.

Via communications supported by wireless communication link 127, the user equipment 110 is able to access one or more server resources in network 190.

In one embodiment, the network environment 100 supports dynamic grants as well as configured grants enabling the communication devices (user equipment) to convey data over a respective wireless uplink to the wireless base station 160.

In this example embodiment, to support configured grant communications, the wireless base station 160 or other suitable resource communicates resource allocation information 125 to the user equipment 110. The resource allocation information 125 includes any suitable information facilitating conveyance of wireless communications in network environment 100. In one embodiment, the resource allocation information 125 indicates resources (such as time domain resources, frequency domain resources, etc.) assigned for use by the user equipment 110 to generate configured grant communications.

Figure 2:
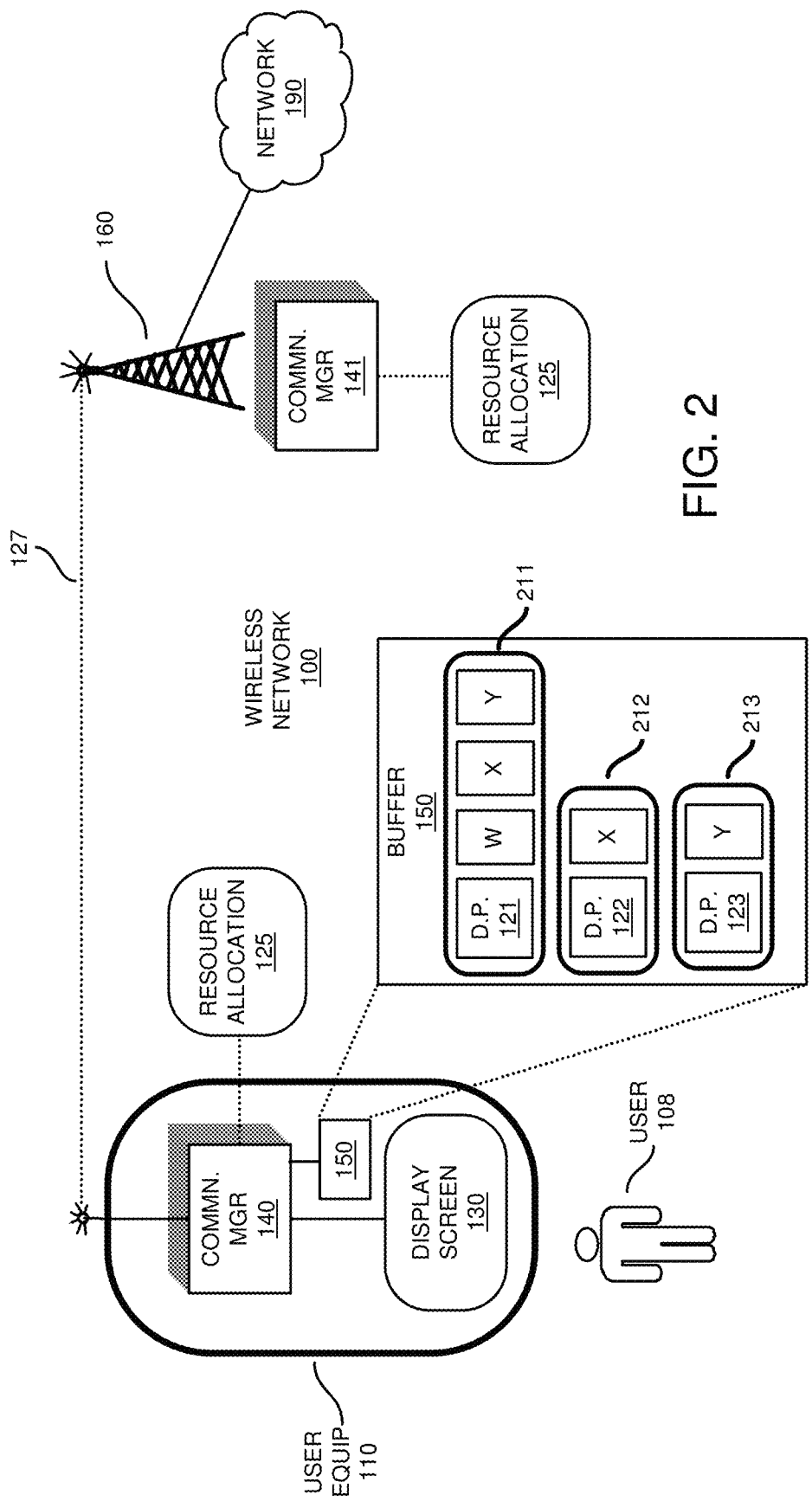
FIG. 2 is an example diagram illustrating generation of messages according to embodiments herein.

FIG. 2 is an example diagram illustrating generation of messages according to embodiments herein.

As shown in this example embodiment, in accordance with the resource allocation information 125, when the user equipment 110 has data to be transmitted in an uplink direction over the wireless communication link 127 to the wireless base station 160, the user equipment 110 produces a first configured grant communication 211 to include: i) first bit information (such as information W) specifying attributes of a first data payload 121 in the first configured grant communication 211, and ii) second bit information (such as information X and Y) specifying attributes of a second data payload 122 and third data payload 123 to be communicated in configured grant communications 212 and 213 from the user equipment 110 to a wireless base station 160.

As further discussed herein, the user equipment 110 communicates the first configured grant communication 211 to the wireless base station 160 such as during a first channel occupancy time (timeslot, timeframe, etc.) over the wireless communication link 127. The user equipment 110 communicates the second configured grant communication 212 to the wireless base station 160 in a second channel occupancy time (timeslot). The second timeslot is delayed (spaced apart) with respect to the first timeslot. The user equipment 110 communicates the third configured grant communication 213 to the wireless base station 160 in a third channel occupancy time (timeslot). The third timeslot is delayed (spaced apart) with respect to the second timeslot.

The communication parameter bit information (such as W, X, and Y) in respective one or more supplemental data fields (such as newly added one or more data fields) in the configured grant communication 211 can be configured to any suitable information. In one embodiment, the information includes time domain information specifying a degree (such as amount of time, timeslots, number of communications, tag, identifier value, process identifier value, etc.) to which the user equipment plans to subsequently use the wireless link 127 (available wireless bandwidth) to convey the second configured grant communication 212 to the wireless base station 160.

In accordance with further embodiments, the bit information (such as W, X, and Y) includes frequency domain information specifying a degree to which the user equipment plans to use available channel bandwidth to convey the second configured grant communication to the wireless base station.

Figure 3:
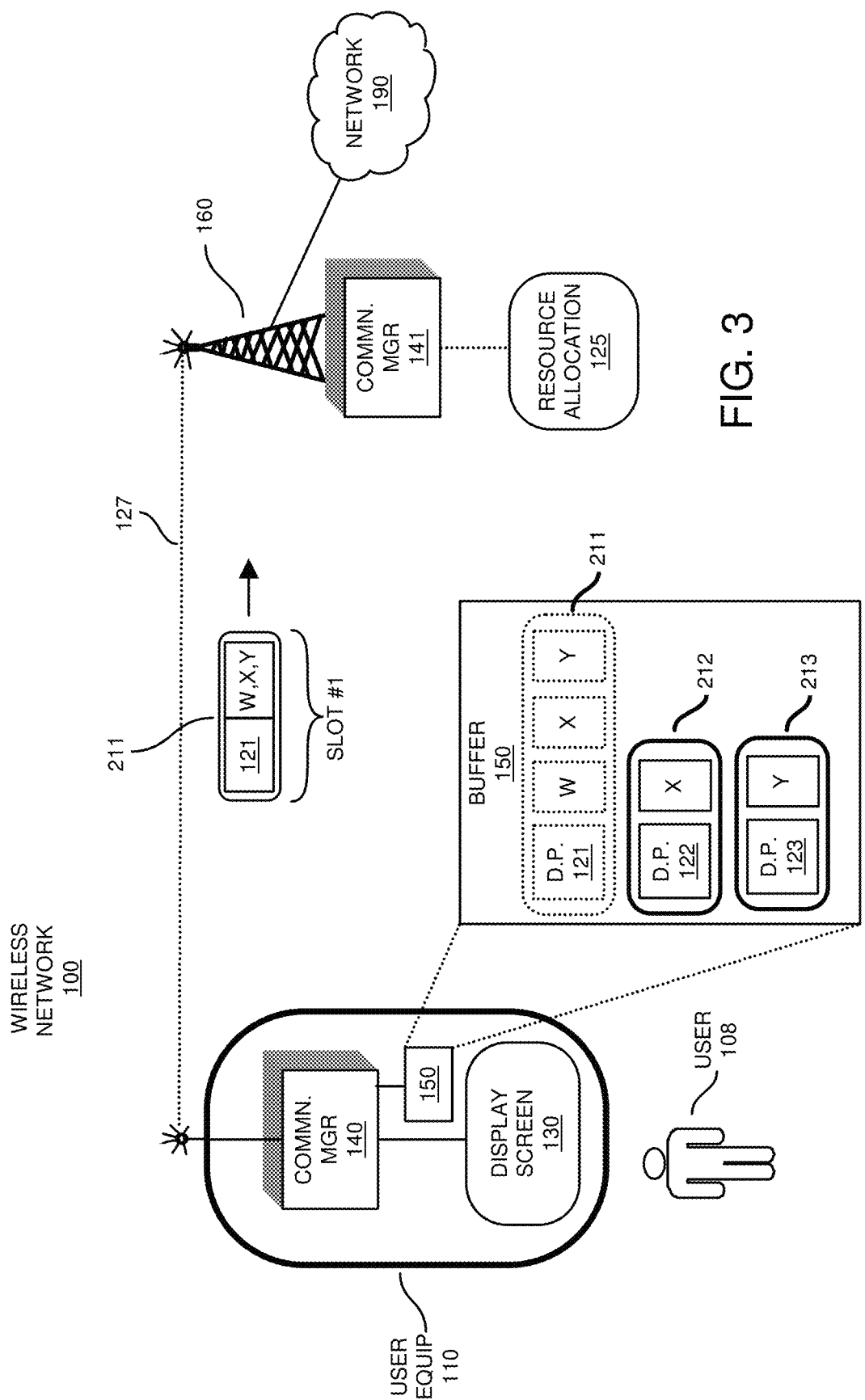
FIG. 3 is an example diagram illustrating communication of a first message including supplemental data according to embodiments herein.

FIG. 3 is an example diagram illustrating communication of a first message including supplemental data according to embodiments herein.

In one embodiment, the user equipment 110 implements a listen before talk protocol to obtain permission to communicate over available wireless bandwidth such as supported by wireless communication link 127.

In one embodiment, in response to receiving or acquiring permission to communicate over the wireless communication link 127, the user equipment 110 communicates the first configured grant communication 211 in slot #1 (granted timeslot, window of time, channel occupancy time, etc.) to the wireless base station 160 such as a (gNodeB).

As previously discussed, the communication manager 141 of wireless base station 160 processes the configured grant communication 211 and learns that the received configured grant communication 211 was generated via a process W (such as Pw). The supplemental data (X and Y) in the configured grant communication 211 also indicates that the user equipment 110 has chosen to use process Px and Py to generate respective configured grant communications to be communicated to the wireless base station 160 in one or more subsequent timeslots.

Figure 4:
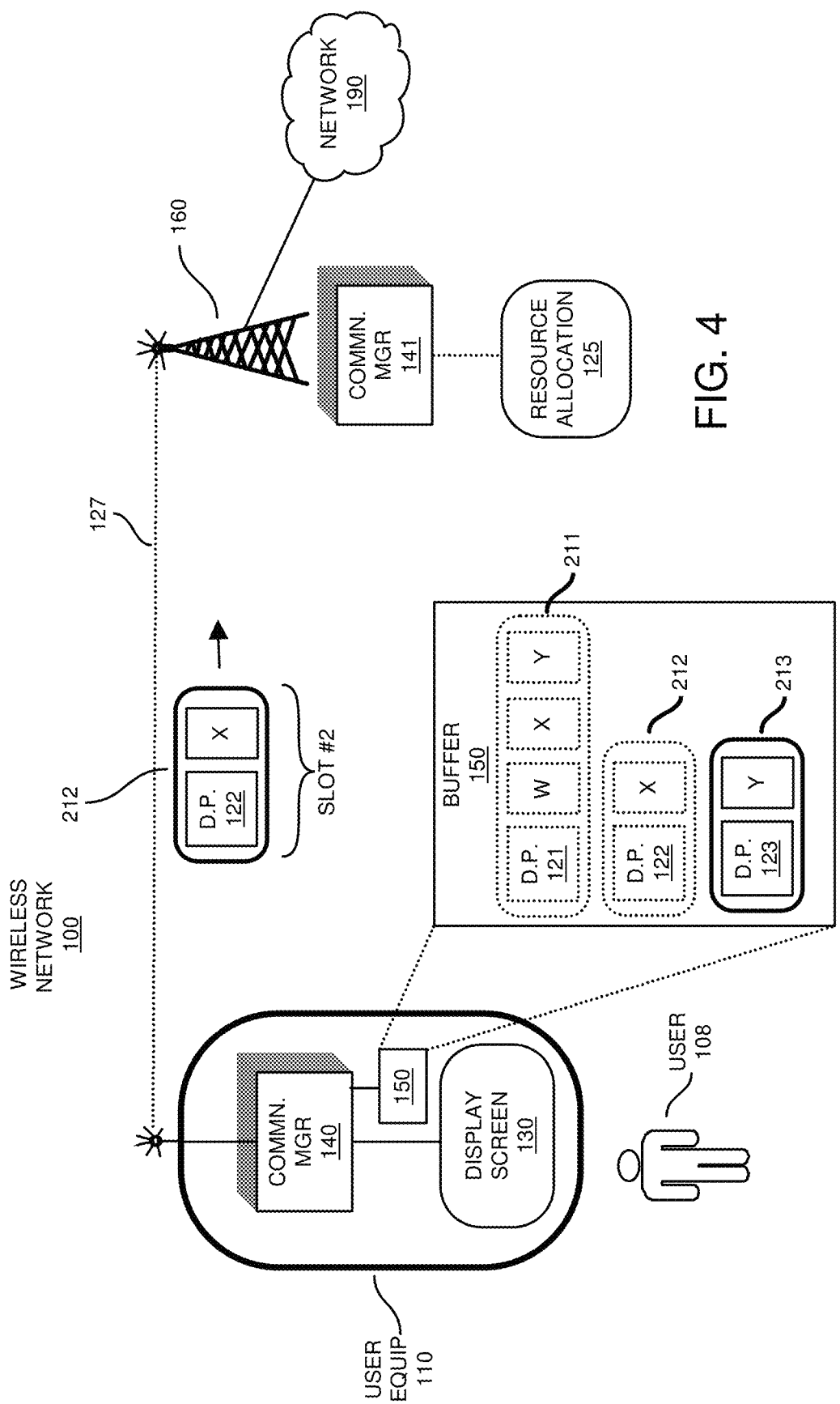
FIG. 4 is an example diagram illustrating communication of a second message according to embodiments herein.

FIG. 4 is an example diagram illustrating communication of a second message according to embodiments herein.

As further shown, the user equipment 110 implements a listen before talk protocol to obtain or acquire permission to communicate over available wireless bandwidth such as supported by wireless communication link 127. In response to receiving permission to communicate over the wireless communication link 127, the user equipment 110 communicates the second configured grant communication 212 in slot #3 (granted timeslot, window of time, channel occupancy time, etc.) to the wireless base station 160 such as a (gNodeB).

Figure 5:
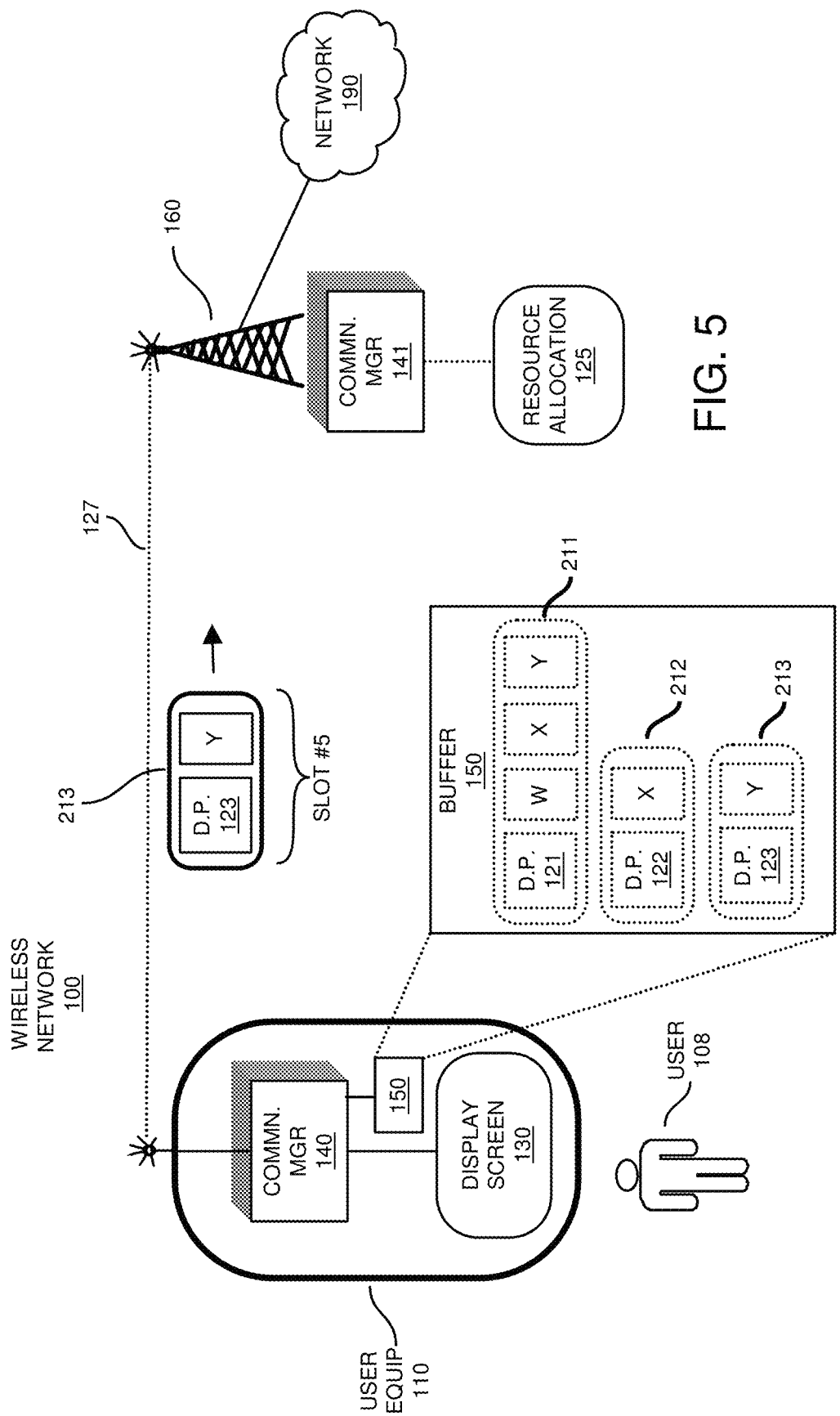
FIG. 5 is an example diagram illustrating communication of a third message according to embodiments herein.

FIG. 5 is an example diagram illustrating communication of a third message according to embodiments herein.

As further shown, the user equipment 110 implements a listen before talk protocol to obtain permission to communicate over available wireless bandwidth such as supported by wireless communication link 127. In response to receiving permission to communicate over the wireless communication link 127, the user equipment 110 communicates the third configured grant communication 213 in slot #5 (granted timeslot) to the wireless base station 160 such as a (gNodeB).

Figure 6:
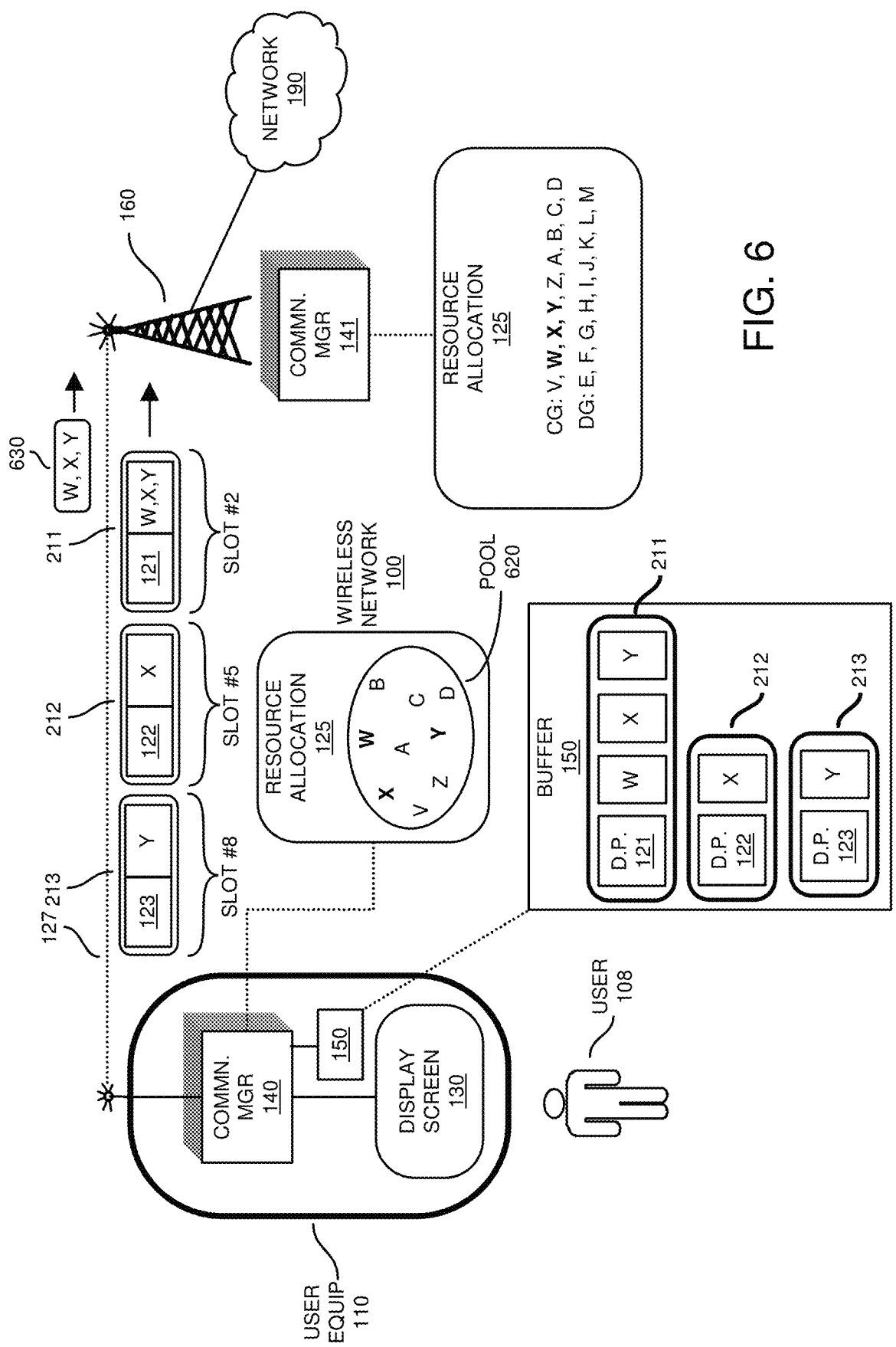
FIG. 6 is an example diagram illustrating allocated identifier values according to embodiments herein.

FIG. 6 is an example diagram illustrating allocated identifier values according to embodiments herein.

In this example embodiment, the wireless base station 160 or other suitable resource) generates the resource allocation information 125 to support dynamic grants and configured grants in network environment 100. The resource allocation information 125 received by the user equipment 110 from the wireless base station 160 (or other suitable resource) includes bit information (such as a pool 620 of process identifier or (process) tag values such as A, B, C, D, W, X, Y, and Z) selectable by the communication manager 140 to support configured grant communications with the wireless base station 160. In one embodiment, the pool 620 includes identifier values (such as HARQ identifier values) allocated to support configured grant communications.

The wireless base station 160 reserves multiple identifier values D, E, F, G, H, I, J, K, L, and M, to support dynamic grants to one or more mobile communication devices present in the network environment 100.

Thus, in one embodiment, in addition to the user equipment 110 being able to generate configured grant communications via identifier values in pool 620, the wireless base station 160 also can be configured to support dynamic assignment of (HARQ) identifier values to user equipment operating in the wireless network environment 100.

As further shown, user equipment 110 generates one or more configured grant communications for communication of respective data payloads 121, 122, 123, etc., over a respective wireless communication link 127 in an uplink direction from the user equipment 110 to the wireless base station 160. In accordance with further embodiments, each of the configured grant communications 211, 212, 213, etc., includes a unique identifier value assigned for use by the user equipment 110.

In one embodiment, prior to transmission, the communication manager 140 stores the configured grant communications (such as configured grant communications 211, 212, and 213) and corresponding data payloads 121, 122, 123, etc., in buffer 150 for subsequent transmission when bandwidth is available.

In one embodiment, in a similar manner as previously discussed, the communication manager 140 implements a listen before talk (LBT) protocol to determine when a respective timeslot of the wireless communication link 127 is free to support uplink communications with the wireless base station 160. Multiple mobile communication devices in network environment 100 compete to use the available bandwidth (such as an unlicensed radio band).

As further shown in this example embodiment, the communication manager 140 assigns process identifier value W (such as a first process identifier value) to generate corresponding configured grant communication 211; communication manager 140 assigns process identifier value X (such as a second identifier value) to generate corresponding configured grant communication 212; communication manager 140 assigns process identifier value Y (such as a third identifier value) to generate the corresponding configured grant communication 213; and so on.

In one embodiment, as shown, the communication manager 140 of user equipment 110 transmits the first configured grant communication 211 in slot #1 (such as a first channel occupancy time); the configured grant communication 211 includes: i) first bit information such as supplemental data W specifying a respective process that was used to generate configured grant communication 211. As further shown, the first configured grant communication 211 transmitted in timeslot #1 also includes second bit information such as supplemental data including identifier value X and Y specifying respective processes associated with generation of configured grant communication 212 and configured grant communication 214 to be communicated in subsequent communications from the user equipment 110 to the wireless base station 160.

In a similar manner as previously discussed, transmission of the uplink control information such as supplemental data X and Y (in addition to supplemental data W) in timeslot #1 notifies the wireless base station 160 of supplemental data assigned to subsequent configured grant communications to be transmitted in timeslot #2 (such as second channel occupancy time) and timeslot #3 (such as third channel occupancy time). Accordingly, the wireless base station 160 is informed via the first configured grant communication 211 that such identifier values (X and Y) are already planned for use by the user equipment 110 and are therefore not available for assignment by the communication manager 141 (wireless base station 160) to other communication devices until such configured grant communication 212 and 213 are received by the wireless base station 160.

As previously discussed, note again that the supplemental data W, X, Y, etc., transmitted in a respective configured grant communication (such as in timeslot #1) may be but need not be HARQ identifier values and can include or be any suitable information.

For example, such supplemental data can include information indicating planned subsequent usage of time slots (channel occupancy times) in which the subsequent configured grant communications are transmitted from the user equipment to the wireless base station. In other words, the wireless base station 160 is informed of the supplemental data W, X, and Y and avoids scheduling the same HARQ processes (Pw, Px, and Py) with a dynamic grant, thereby avoiding collisions.

In one embodiment, the planned usage information (such as supplemental data W, X, Y, etc.) indicates time domain information specifying a degree to which the user equipment 110 and communication manager 140 plans to use subsequent available timeslots (such as which timeslot, how many timeslots, etc.) associated with wireless communication link 127 to convey respective data to the wireless base station 160.

In accordance with another embodiment, the planned usage information (such as supplemental data W, X, Y, etc.) indicates frequency domain information specifying a degree to which the user equipment plans to use available channels (how many of one or more available 20 MHz wireless channels will be used or needed in subsequent timeslots) to convey respective data to the wireless base station in the subsequent timeslots.

In accordance with yet further embodiments, the planned usage information (such as supplemental data W, X, Y, etc.) indicates transmission parameter settings (such as modulation type, encoding type, wireless transmission information, MIMO information, etc.) associated with the buffered data payloads 121, 122, 123, etc., to be communicated in subsequent configured grant communications or timeslots from the user equipment 110 to the wireless base station 160.

Thus, in terms of UCI (Uplink Control Information) content, apart from HARQ ID, NDI, RV, and COT sharing information, at least the following are proposed to be included in a respective configured grant communication from user equipment 110 to a wireless base station 160: i) user equipment identifier, and ii) information on upcoming configured grant PUSCH communications to be transmitted in subsequent time slots.

To reduce the impact on AUL UCI payload, the UE ID can be indicated implicitly, for example, by scrambling the configured grant PUSCH CRC with user equipment RNTI. Including the user equipment identifier value in a respective configured grant serves as an additional confirmation in the event of intra-cell or inter-cell collisions on CG resources from multiple UEs.

Also beneficial to include in the UCI (uplink control information), assuming it is transmitted once at the start of the CG burst, is information on upcoming CG PUSCH communications in subsequent slots either in the same COT or a later COT. For example, UCI can indicate which CG HARQ-IDs (such as indicated by W, X, and Y) the UE has already allocated for UL data in its buffer but will not be transmitted in the current COT (due to MCOT limits). As described herein, the wireless base station 160 (gNB) can use this information to avoid scheduling the same HARQ processes (Pw, Px, and Py) with a dynamic grant, thereby avoiding SUL-CG HARQ ID collisions.

Note that as an alternative to communicating the multiple selected values (such as process identifier information) in a respective configured grant communication 213, embodiments herein can include sending a notification (such as via communication 630) separate from the configured grant communications 211, 212, and 213. For example, in one embodiment, prior to sending the configured grant communications 211, 212, and 213, the user equipment 110 transmits communication 630 to the wireless base station 160; the communication 630 indicates identifier values (and corresponding processes Pw, Px, and Py) selected by the user equipment 110 to transmit different configured grant communications to the wireless base station 160 in the future. Thus, the communication 630 provides a pre-notification of which of multiple identifier values in the pool have been selected and reserved by the user equipment 110 for subsequent use.

Figure 7:
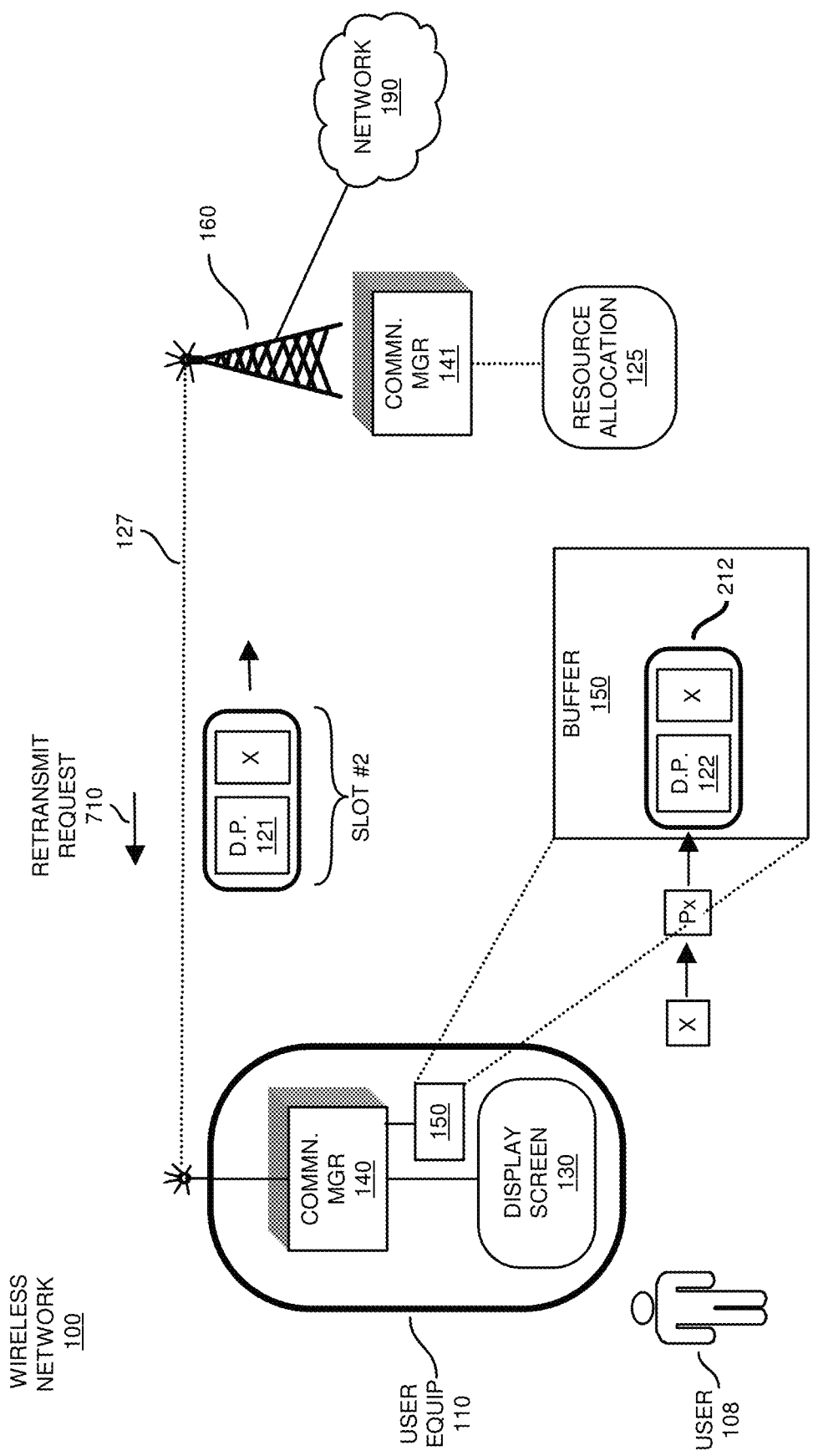
FIG. 7 is an example diagram illustrating a retransmit request and retransmission of a communication according to embodiments herein.

FIG. 7 is an example diagram illustrating a retransmit request and retransmission of a communication according to embodiments herein.

Assume in this example embodiment that the communication manager 141 fails to properly receive the communication 212 from the user equipment 110 over the wireless communication link 127. In such an instance, the communication manager 141 transmits a retransmit request message 710 over wireless communication link 127 to the user equipment 160. In one embodiment, the retransmit request message 710 specifies identifier value (such as X) indicating an identity of the message that was not received properly.

In accordance with further embodiments, in response to receiving the retransmit request message 710 from the wireless base station 160, the communication manager 140 of user equipment 110 uses the identifier value X to identify a corresponding process that is to be used to duplicate, regenerate, identify, etc., the original lost or failed configured grant communication 212 previously transmitted in timeslot #2.

In this example embodiment, the user equipment 110 maps the identifier value X (in the received message 710) to the process Px, which is then used to reproduce or at least retrieve the configured grant communication 212 for subsequent transmission.

The communication manager 140 then retransmits the generated configured grant communication 212 in a next obtained timeslot #10 over the wireless communication link 127 to the communication manager 140 of the wireless base station 160.

Accordingly, the supplemental information X (such as a HARQ identifier value selected by the communication manager 140 for a respective configured grant communication) can be used to facilitate more robust communications in the wireless network 100.

Figure 8:
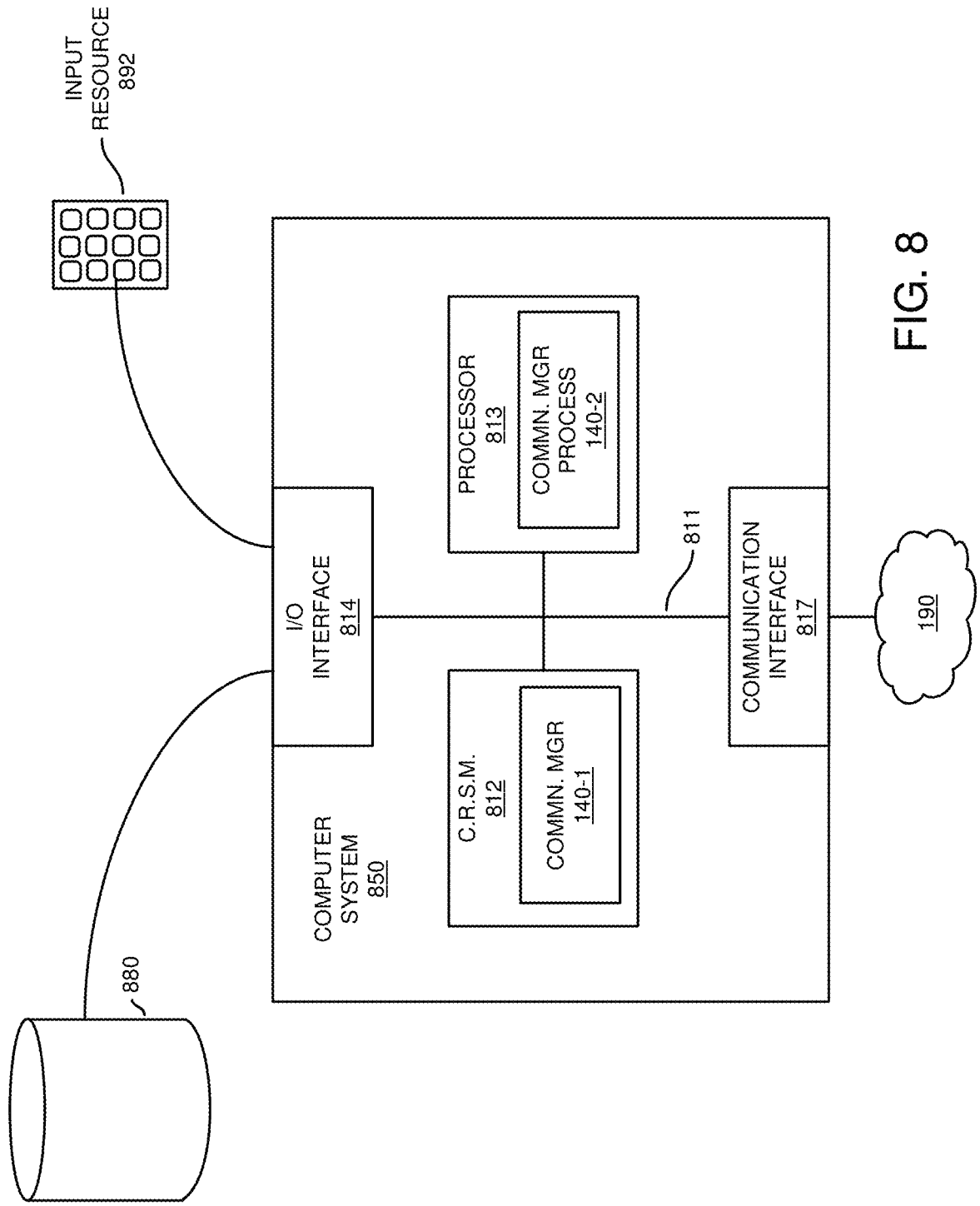
FIG. 8 is an example diagram illustrating example computer hardware and software operable to execute one or more operations according to embodiments herein.

FIG. 8 is an example block diagram of a computer system for implementing any of the operations as previously discussed according to embodiments herein.

Any of the resources (such as communication manager 140, communication manager 141, user equipment 160, wireless base station 160, etc.) as discussed herein can be configured to include computer processor hardware and/or corresponding executable instructions to carry out the different operations as discussed herein.

As shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication manager application 140-1 (e.g., including instructions) in a respective wireless station to carry out any of the operations as discussed herein.

During operation of one embodiment, processor 813 accesses computer readable storage media 812 via the use of interconnect 811 in order to launch, run, execute, interpret or otherwise perform the instructions in communication manager application 140-1 stored on computer readable storage medium 812. Execution of the communication manager application 140-1 produces communication manager process 140-2 to carry out any of the operations and/or processes as discussed herein.

Those skilled in the art will understand that the computer system 850 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
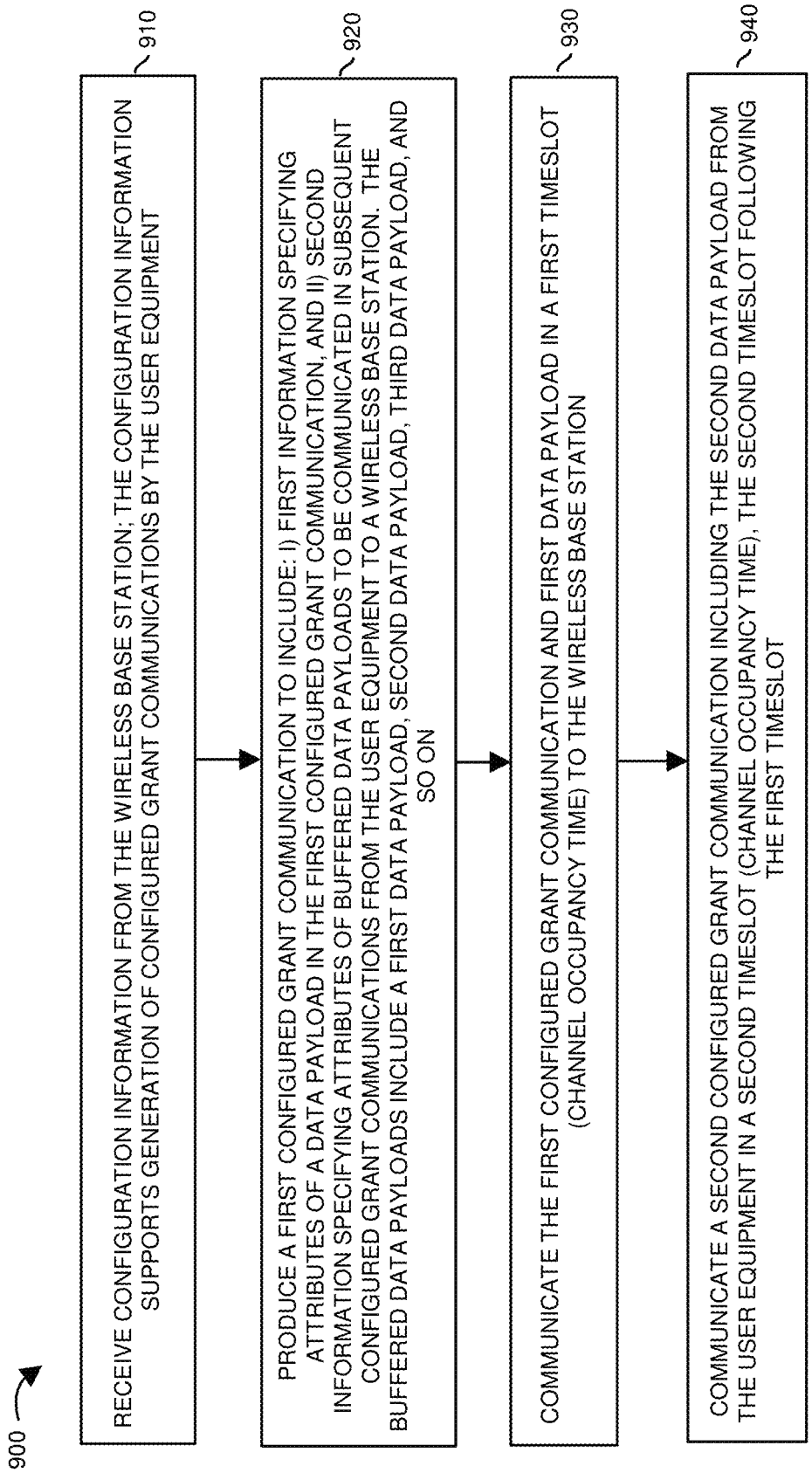
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the user equipment 110 produces a first configured grant communication 211 to include: i) first information W (one or more data bits) specifying attributes of a first data payload 121 in the first configured grant communication 211, and ii) second information X (one or more data bits) specifying attributes of a second data payload 122 to be communicated in a second configured grant communication 212 from the user equipment 110 to a wireless base station 160.

In processing operation 920, the communication management 140 of user equipment 110 communicates the first configured grant communication 211 in a first timeslot to the wireless base station 160.

In processing operation 930, the communication management resource 140 communicates the second configured grant communication 212 from the user equipment 110 in a second timeslot to the wireless base station 160, the second timeslot delayed with respect to the first timeslot.

Figure 10:
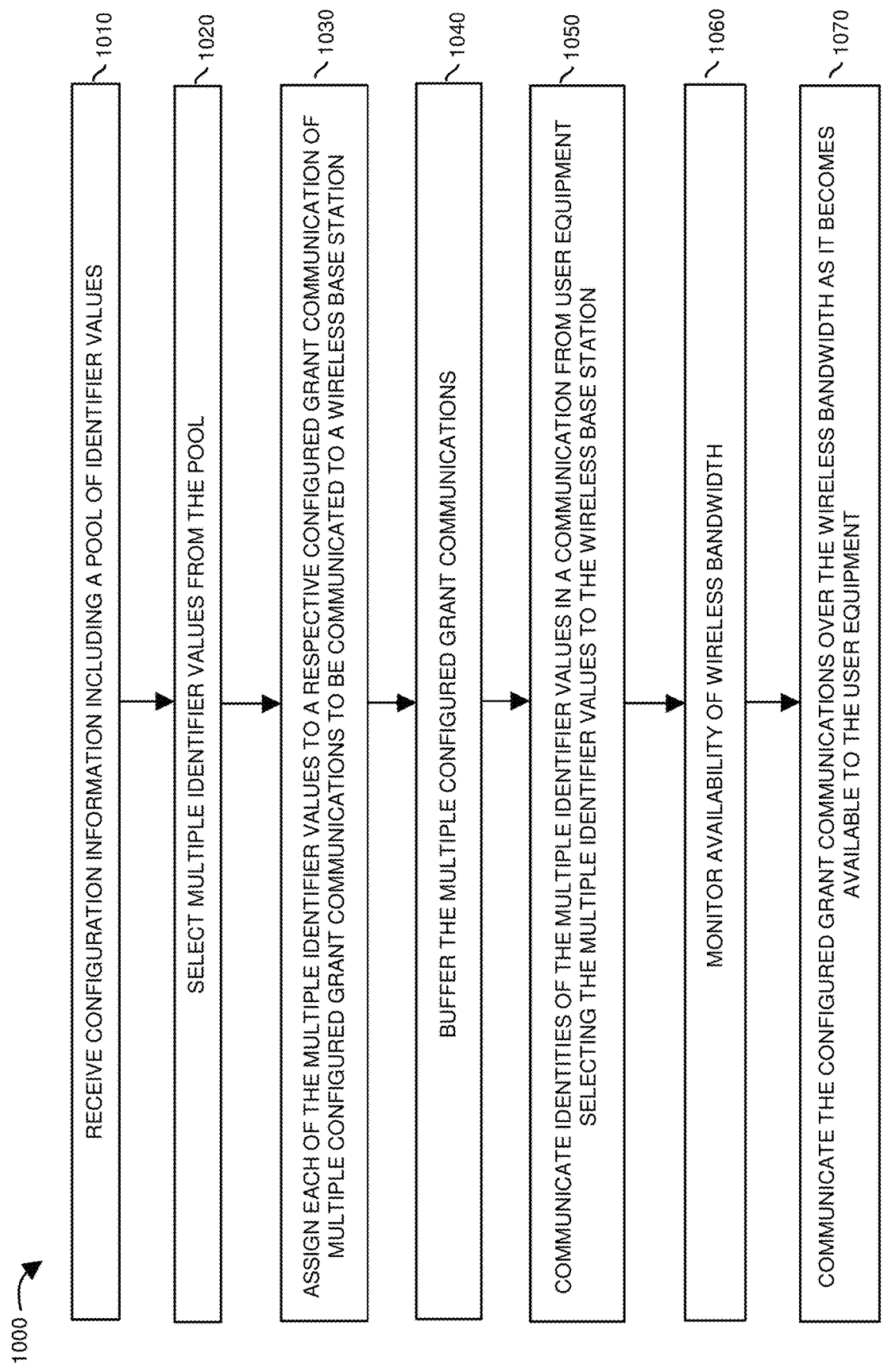
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the user equipment 110 receives allocation of resources (resource allocation information 125) including a pool 620 of identifier values W, X, Y, Z, A, B, C, and D.

In processing operation 1020, the communication management resource 140 selects multiple identifier values W, X, and Y from the pool 620.

In processing operation 1030, the communication management resource 140 assigns each of the multiple identifier values W, X, and Y to a respective configured grant communication of multiple configured grant communications to be communicated to the wireless base station 160.

In processing operation 1040, the user equipment 110 buffers the multiple configured grant communications in buffer 150.

In processing operation 1050, the user equipment 110 communicates identities of the multiple identifier values W, X, and Y in a communication (such as a configured grant communication) from user equipment 110 to the wireless base station 160.

In processing operation 1060, the communication management resource 140 monitors availability of wireless bandwidth over wireless communication link 127 to communicate the configured grant communication communications 211, 212, and 213.

In processing operation 1070, the communication management resource 140 of the user equipment 160 communicates the configured grant communications 211, 212, and 213, over the wireless communication link (wireless bandwidth) as it becomes available to the user equipment 160.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at user equipment in a wireless network environment:
   producing a first configured grant communication to include: i) first bit information specifying attributes of a first data payload in the first configured grant communication, and ii) second bit information specifying attributes of a second data payload to be communicated in a second configured grant communication from the user equipment to a wireless base station; and
   communicating the first configured grant communication to the wireless base station.

2. The method as in claim 1 further comprising:
   communicating the first configured grant communication from the user equipment in a first timeslot to the wireless base station; and
   communicating the second configured grant communication from the user equipment in a second timeslot to the wireless base station, the second timeslot delayed with respect to the first timeslot.

3. The method as in claim 1, wherein the attributes as specified by the second bit information indicates planned usage of a wireless link over which the second configured grant communication is to be transmitted from the user equipment to the wireless base station.

4. The method as in claim 3, wherein the second bit information includes time domain information specifying a degree to which the user equipment plans to subsequently use the wireless link to convey the second configured grant communication to the wireless base station.

5. The method as in claim 1, wherein the second bit information includes frequency domain information specifying a degree to which the user equipment plans to use available channel bandwidth to convey the second configured grant communication to the wireless base station.

6. The method as in claim 1, wherein the second bit information indicates communication transmission parameter settings associated with communicating the second configured grant communication to the wireless base station.

7. The method as in claim 1 further comprising:
   at the user equipment, receiving resource allocation information from the wireless base station, the resource allocation information including multiple identifier values selectable by the user equipment to generate configured grant communications.

8. The method as in claim 7, wherein the first bit information includes a first identifier value and wherein the second bit information includes a second identifier value, each of first identifier value and the second identifier value being selected from the multiple identifier values as specified by the resource allocation information; and
   wherein the attributes of the first data payload include the first identifier value; and
   wherein the attributes of the second data payload include the second identifier value.

9. The method as in claim 1, wherein the attributes as specified by the first bit information includes a first identifier value selected by the user equipment to communicate the first configured grant communication including the first data payload over a shared wireless communication link; and
   wherein the attributes as specified by the second bit information includes a second identifier value selected by the user equipment to communicate the second configured grant communication including the second data payload over the shared wireless communication link.

10. The method as in claim 1, wherein the wireless base station is operable to support configured grants and dynamic grants in an unlicensed radio band over which the user equipment communicates the first configured grant communication in an uplink direction to the wireless base station.

11. The method as in claim 1 further comprising:
selecting the first attributes of the first data payload based on communications received from the wireless base station; and
selecting the second attributes of the second data payload based on the communications received from the wireless base station.

12. The method as in claim 1 further comprising:
selecting attributes of the first data payload to include a first process identifier value received from the wireless base station; and
selecting attributes of the second data payload to include a second process identifier value received from the wireless base station.

13. The method as in claim 1, wherein the first bit information includes a first process identifier value and wherein the second bit information includes a second process identifier value.

14. The method as in claim 1, wherein the second bit information is a tag assigned to the second data payload.

15. The method as in claim 1 further comprising:
at the user equipment:
producing the second configured grant communication to include the second bit information; and
communicating the second configured grant communication to the wireless base station.

16. The method as in claim 15, wherein the first bit information is a first identifier value received from the wireless base station; and
wherein the second bit information is a second identifier value received from the wireless base station.

17. The method as in claim 16 further comprising:
communicating the first configured grant communication from the user equipment to the wireless base station in a first time slot; and
communicating the second configured grant communication from the user equipment to the wireless base station in a second time slot, the second time slot occurring after the first time slot.

18. The method as in claim 1, wherein the second bit information in the first configured grant communication includes a process identifier value selected by the user equipment for inclusion in the second configured grant communication.

19. The method as in claim 1 further comprising:
tagging the second data payload in the second configured grant communication with a process identifier value.

20. The method as in claim 19, wherein the process identifier value indicates a respective process chosen by the user equipment to generate the second configured grant communication.

21. The method as in claim 1 further comprising:
via implementation of a listen before talk protocol at the user equipment, acquiring permission to communicate over a wireless communication link from the user equipment to the wireless base station; and
communicating the second configured grant communication over the wireless communication link from the user equipment to the wireless base station.

22. The method as in claim 1, wherein the first bit information includes a first HARQ (Hybrid Automatic Repeat Request) identifier value; and wherein the second bit information includes a second HARQ (Hybrid Automatic Repeat Request) identifier value.

23. The method as in claim 1, wherein the second bit information indicates a process identifier value assigned for use by the user equipment to communicate with the wireless base station.

24. The method as in claim 1, wherein the second bit information indicates a process identifier value allocated for use by the user equipment to tag the second data payload in the second configured grant communication.

25. A system comprising:
user equipment in communication with a wireless base station, the user equipment operable to:
produce a first configured grant communication to include: i) first information specifying attributes of the first configured grant communication, and ii) second information specifying attributes of a second configured grant communication scheduled to be communicated from the user equipment to the wireless base station after communication of the first configured grant communication; and
communicating the first configured grant communication to the wireless base station.

26. The system as in claim 25, wherein the user equipment is further operable to:
communicate the first configured grant communication from the user equipment in a first timeslot to the wireless base station; and
communicate the second configured grant communication from the user equipment in a second timeslot to the wireless base station, the second timeslot delayed with respect to the first timeslot.

27. The system as in claim 25, wherein the attributes as specified by the second information indicates planned usage of a wireless link over which the second configured grant communication is scheduled to be transmitted from the user equipment to the wireless base station.

28. The system as in claim 27, wherein the second information includes time domain information specifying a degree to which the user equipment plans to subsequently use the wireless link to convey the second configured grant communication to the wireless base station.

29. The system as in claim 25, wherein the second information includes frequency domain information specifying a degree to which the user equipment plans to use available channel bandwidth to convey the second configured grant communication to the wireless base station.

30. The system as in claim 25, wherein the second information indicates communication transmission parameter settings associated with communicating the second configured grant communication to the wireless base station.

31. The system as in claim 25, wherein the user equipment is further operable to:
receive configuration information from the wireless base station, the configuration information including multiple identifier values selectable by the user equipment to communicate configured grant communications.

32. The system as in claim 31, wherein the first information includes a first identifier value and wherein the second information includes a second identifier value, each of the first identifier value and the second identifier value being selected from the multiple identifier values as specified by the configuration information;
wherein the first configured grant communication includes the first identifier value and the second identifier value; and wherein the second configured grant communication includes the second identifier value.

33. The system as in claim 25, wherein the first information includes a first identifier value selected by the user equipment to communicate the first configured grant communication over a shared wireless communication link; and wherein the second information includes a second identifier value selected by the user equipment to communicate the second configured grant communication over the shared communication link.

34. Computer-readable storage hardware having instructions stored thereon, the instructions, when carried out by computer processor hardware, cause the computer processor hardware to:

produce a first configured grant communication to include: i) first information specifying attributes of the first configured grant communication, and ii) second information specifying attributes of a second configured grant communication;

communicate the first configured grant communication to the wireless base station; and communicate the second configured grant communication to the wireless base station.

35. A method comprising:

receiving a pool of multiple identifier values from a wireless base station;

selecting a set of multiple identifier values from the pool;

assigning each of the multiple identifier values in the set to a respective configured grant communication of multiple configured grant communications to be communicated to the wireless base station; and communicating identities of the multiple identifier values in the set in a communication from user equipment selecting the multiple identifier values to the wireless base station.

36. The method as in claim 35, wherein the communication is a first configured grant communication communicated from the user equipment to the wireless base station, the first configured grant communication including a first data payload generated by the user equipment, the first configured grant communication assigned a first identifier value of the multiple identifier values in the set.

37. The method as in claim 36, wherein the set of multiple identifier values include the first identifier value and a second identifier value, the method further comprising:

communicating a second configured grant communication to the wireless base station, the second configured grant communication including the second identifier value and a second data payload generated by the user equipment.

38. The method as in claim 36, wherein the first configured grant communication and the second configured grant communication are transmitted during separate channel occupancy times.

39. The method as in claim 35, wherein the set of multiple identifier values are HARQ (Hybrid Automatic Repeat Request) identifier values corresponding to PUSCH (Physical Uplink Shared Channel) transmissions in subsequent slots.

40. The method as in claim 35, wherein the set of multiple identifier values are supplemental data for selective inclusion in configured grant Uplink Control Information (UCI) of a first uplink configured grant communication.

* * * * *